(12) United States Patent
Goor

(10) Patent No.: US 11,310,888 B2
(45) Date of Patent: Apr. 19, 2022

(54) CONTROLLER FOR CONTROLLING A LIGHTING DEVICE AND A METHOD THEREOF

(71) Applicant: SIGNIFY HOLDING B.V., Eindhoven (NL)

(72) Inventor: Jan Goor, Houten (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/960,178

(22) PCT Filed: Dec. 14, 2018

(86) PCT No.: PCT/EP2018/084958
§ 371 (c)(1),
(2) Date: Jul. 6, 2020

(87) PCT Pub. No.: WO2019/134805
PCT Pub. Date: Jul. 11, 2019

(65) Prior Publication Data
US 2021/0059031 A1 Feb. 25, 2021

(30) Foreign Application Priority Data
Jan. 5, 2018 (EP) .................................. 18150388

(51) Int. Cl.
*H05B 47/115* (2020.01)
*H05B 47/11* (2020.01)

(52) U.S. Cl.
CPC .......... *H05B 47/115* (2020.01); *H05B 47/11* (2020.01)

(58) Field of Classification Search
CPC ............................. H05B 47/11; H05B 47/115
See application file for complete search history.

(56) References Cited

U.S. PATENT DOCUMENTS

| 2012/0019168 A1* | 1/2012 | Noda | G06K 9/2027 |
| | | | 315/307 |
| 2015/0035440 A1 | 2/2015 | Spero | |
| 2015/0237704 A1* | 8/2015 | Siegel | G03B 21/14 |
| | | | 353/29 |
| 2016/0278186 A1 | 9/2016 | Van De Sluis et al. | |

(Continued)

FOREIGN PATENT DOCUMENTS

| EP | 2410822 B1 | 5/2016 |
| JP | 2012033416 A | 2/2012 |

(Continued)

OTHER PUBLICATIONS

Machine translation of JP2012-033416A. (Year: 2012).*

*Primary Examiner* — Alexander H Taningco
*Assistant Examiner* — Pedro C Fernandez

(57) ABSTRACT

A method of controlling a lighting device is disclosed. The method comprises: detecting a first location of a user in an area, obtaining a second location of the lighting device and/or its light effect in the area, obtaining object information about an object, the object information comprising at least dimensions of the object and a third location of the object in the area, determining, based on the first, second and third location and the object dimensions, if the object is located between the user and the lighting device and/or its light effect, and controlling the lighting device based on the determination.

15 Claims, 4 Drawing Sheets

(56) References Cited

U.S. PATENT DOCUMENTS

2017/0019970 A1* 1/2017 Chemel .................. F21S 8/04
2017/0265277 A1 9/2017 Nolan et al.
2017/0276324 A1 9/2017 Zapata et al.

FOREIGN PATENT DOCUMENTS

WO 2010070517 A1 6/2010
WO 2012129243 A1 9/2012
WO 2014040978 A1 3/2014

* cited by examiner

CONTROLLER FOR CONTROLLING A LIGHTING DEVICE AND A METHOD THEREOF

CROSS-REFERENCE TO PRIOR APPLICATIONS

This application is the U.S. National Phase application under 35 U.S.C. § 371 of International Application No. PCT/EP2018/084958, filed on Dec. 14, 2018, which claims the benefit of European Patent Application No. 18150388.9, filed on Jan. 5, 2018. These applications are hereby incorporated by reference herein.

FIELD OF THE INVENTION

The invention relates to a method of controlling a lighting device and to a computer program product for executing the method. The invention further relates to a controller and a system for controlling a lighting device.

BACKGROUND

Indoor and outdoor positioning systems are used to determine locations of users and to control connected lighting devices of a lighting system based on these user locations. For instance, when a user enters a space, such as a living room or an office space, the location of the user may be tracked and lighting devices of the lighting system may be controlled based on the current location of a user. These systems save energy by switching on lighting devices that are located within a proximity range of the user, and by turning off or dimming lighting devices outside the proximity range.

Japanese patent application JP 2012/033416 A discloses a control system for controlling the space of the environment in which the user is present, and to control the illumination in the space based on a positional relationship of a user and an object and its depth and height.

SUMMARY OF THE INVENTION

The inventor has realized that if a lighting device is not visible to a user, it does not make sense to switch that lighting device on. It is therefore an object of the present invention to further reduce energy consumption of a lighting system.

According to a first aspect of the present invention, the object is achieved by a method of controlling a lighting device, the method comprising:
detecting a first location of a user in an area,
obtaining a second location of the lighting device and/or its light effect in the area,
obtaining object information about an object, the object information comprising at least dimensions of the object and a third location of the object in the area,
determining, based on the first, second and third location and the object dimensions, if the object is located between the user and the lighting device and/or its light effect, and
controlling the lighting device based on the determination.

The method enables determining whether an object is located between a user and a lighting device based on their locations. Additionally or alternatively, the method enables determining whether an object is located between a user and a lighting device's light effect based on their locations. By controlling the lighting device based on the determination, for example by switching the lighting device off or by dimming the light output of the lighting device when the object is located between the user and the lighting device and/or its effect, energy consumption can be reduced.

The step of determining if the object is located between the user and the lighting device and/or its light effect may comprise: determining a level of light, emitted by the lighting device, being visible from the first location, and the step of controlling the lighting device may comprise controlling the lighting device based on the level of light being visible from the first location. This enables determining to which extent the light effect created by the lighting device is visible to the user, and controlling the lighting device based thereon. This may be beneficial because it enables more detailed lighting control for certain situations. It may be beneficial to take the level of light being blocked by the object into account when controlling the lighting device, because the level of light being blocked by the object influences to what extent the light effect of that lighting device is visible to the observer.

The method may comprise determining a dim level for the light emitted by the lighting device based on the determination. Additionally or alternatively, the method may comprise switching the lighting device off if the object is located between the user and the lighting device and/or its light effect. If the lighting device and/or its light effect is not visible from the user's location, it may be beneficial to dim the lighting device to a low dimming level or to switch it completely off. If the lighting device's light effect is barely visible from the user's location, it may be beneficial to dim the lighting device to a low dimming level or to switch it completely off.

The step of controlling the lighting device may comprise: controlling the lighting device according to a light setting associated with the user. The light setting may for example be determined by a lighting control system or provided by the user, for example via a user interface. This enables controlling the lighting device according to a light setting associated with a specific user.

The method may further comprise the step of determining a distance between the user and the lighting device and/or its light effect, and the step of controlling the lighting device may further comprise: controlling the lighting device based on the distance. It may be beneficial to take the distance between the user and the lighting device into account when controlling the lighting device, because the distance between a lighting device and an observer influences to what extent the light effect of that lighting device is visible to the observer.

The method may further comprise: detecting a fourth location of a second user in the area, determining, based on the fourth, second and third location and the object dimensions, if the object is located between the second user and the lighting device and/or its light effect, and controlling the lighting device according to a first light setting associated with the user if the object is located between the second user and the lighting device and/or its light effect, or controlling the lighting device according to a second light setting associated with the second user if the object is located between the user and the lighting device and/or its light effect. In other words, the lighting device is controlled according to a light setting associated with a user that can see the lighting device and/or its light effect. This is beneficial, because it improves the illumination of the area for a first user and meanwhile does not worsen the area illumination for a second user.

Additionally, the method may comprise: determining a first distance between the user and the lighting device, determining a second distance between the second user and the lighting device, and controlling, if the object is not located between the user and the lighting device and/or its light effect and not located between the second user and the lighting device and/or its light effect, the lighting device according to the first light setting if the first distance is shorter than the second distance. In other words, if both users can see the lighting device and/or its light effect, the lighting device is controlled according to a light setting associated with a user that is closest to the lighting device. Thus, the system executing the method performs arbitration to optimize the illumination of the area for both users. This is beneficial, especially when the difference between the first distance and the second distance is large.

Additionally or alternatively, the method may comprise: determining a first level of light, emitted by the lighting device, being visible from the first location, and determining a second level of light, emitted by the lighting device, being visible from the second location, and controlling the lighting device according to a light setting associated with the user or the second user depending on the first and second levels of light. Thus, the system executing the method performs arbitration to optimize the illumination of the area for both users.

The first light setting may have a higher priority value than the second light setting. The method may comprise: controlling, if the object is not located between the user and the lighting device and/or its light effect and not located between the second user and the lighting device and/or its light effect, the lighting device according to the first light setting based on the higher priority value. In other words, if both users can see the lighting device and/or its light effect, the lighting device is controlled according to a light setting which has the highest priority value. A priority value may for example be predetermined, based on a characteristic of the light setting (e.g. its brightness, color or saturation), based on a user profile, etc. Thus, the system executing the method performs arbitration to optimize the illumination of the area for both users.

Additionally or alternatively, the method may further comprise controlling, if the object is not located between the user and the lighting device and/or its light effect and not located between the second user and the lighting device and/or its light effect, the lighting device according to a compound light setting, which compound light setting is a mix of the first light setting and the second light setting. Thus, the system executing the method performs arbitration to optimize the lighting requirements for both users.

The object information further comprises transparency information about the object. A lighting device and/or its light effect may be visible to a user through a transparent object. Therefore, access to transparency information about the object is beneficial if the object is a transparent object, such as a window or a semi-transparent wall.

The object information may further comprise information about the orientation of the object. In embodiments, it may be beneficial to obtain information about the orientation of the object, for instance when the object is a repositionable object such as furniture, because a change in orientation may influence whether the object is located between the user and the lighting device and/or its light effect.

The object may be located at a fixed location relative to the area. The object may, for instance, be building infrastructure such as a room separator such as a wall, a window, a ceiling, a floor, etc. that separates rooms in the area. Alternatively, the object is repositionable relative to the area. The object may, for instance, be furniture such as a cabinet, a table or a chair, be a device such as a monitor, a loud speaker, or be a plant, etc.

According to a second aspect of the present invention, the object is achieved by a computer program product for a computing device, the computer program product comprising computer program code to perform any one of the above-mentioned methods when the computer program product is run on a processing unit of the computing device.

According to a third aspect of the present invention, the object is achieved by a controller for controlling a lighting device, the controller comprising:
a receiver configured to receive a detected first location of a user in an area, and
a processor configured to obtain a second location of the lighting device and/or its light effect in the area, to obtain object information about an object, the object information comprising at least dimensions of the object and a third location of the object in the area, to determine, based on the first, second and third location and the object dimensions, if the object is located between the user and the lighting device and/or its light effect, and to control the lighting device based on the determination.

According to a fourth aspect of the present invention, the object is achieved by a system comprising the controller and a lighting device configured to receive lighting control commands from the controller.

It should be understood that the computer program product, controller and system may have similar and/or identical embodiments and advantages as the claimed method.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
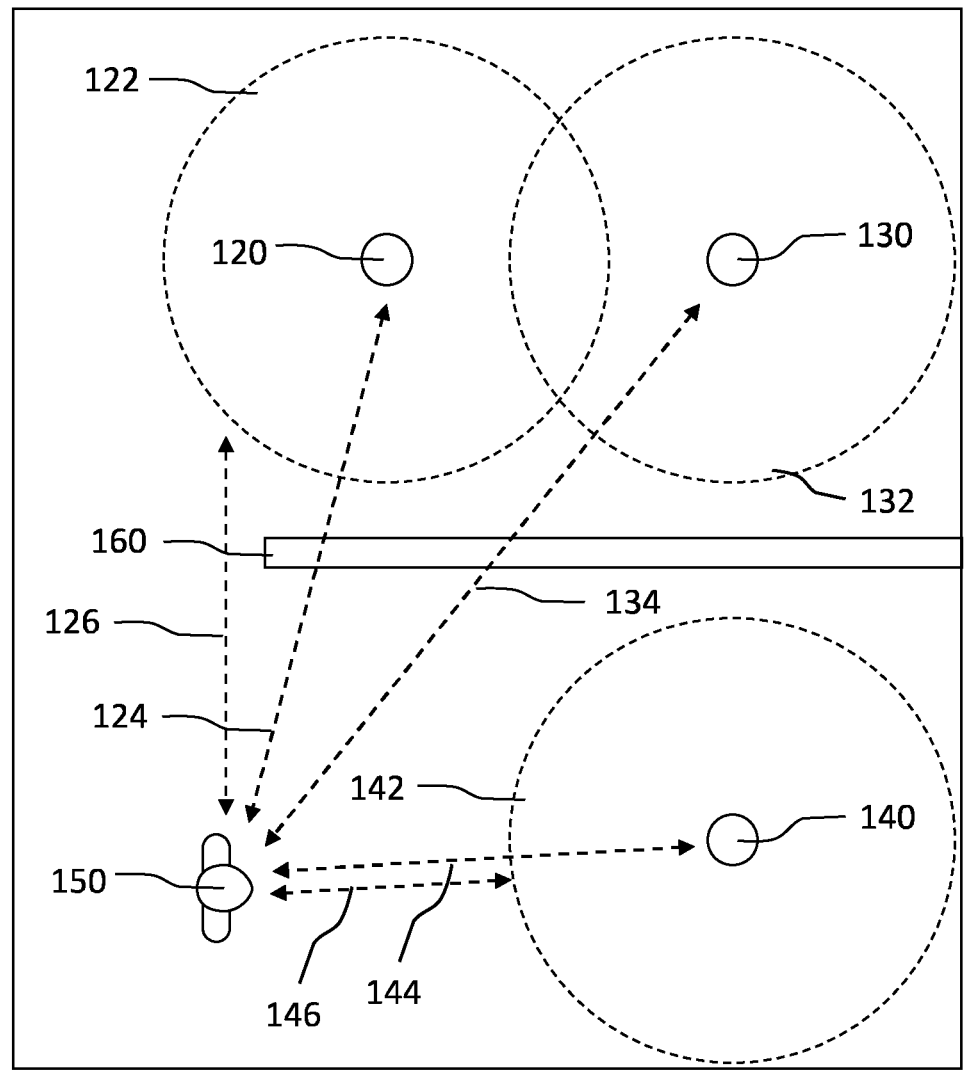
FIG. 1 shows schematically an embodiment of a top view of a system comprising a plurality of lighting devices and a controller.
Figure 1:
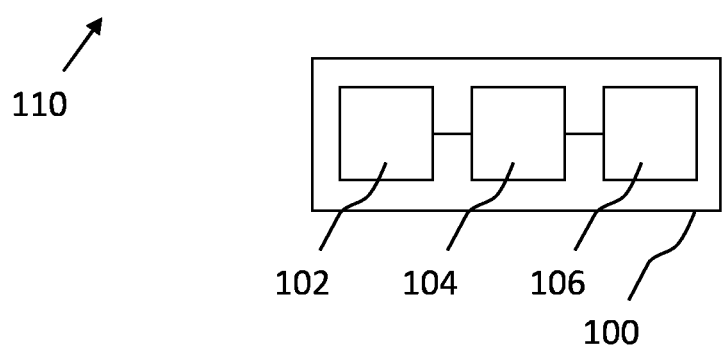

FIG. 1 shows a top view of an area 110, such as a room, comprising a lighting system. The lighting system comprises a plurality of lighting devices 120, 130, 140. The area 110 further comprises an object 160, such as a room separator separating the area 110 into two rooms (e.g. a wall) or a piece of furniture. In FIG. 1, a user 150 is present in the area 110. FIG. 1 further illustrates a controller 100 comprising a receiver 102, a processor 104 and a transmitter 106. The receiver 102 is configured to receive a detected first location of the user 150 in the area 110. The controller 100 further comprises a processor 104 (e.g. a microcontroller, circuitry, a microchip) configured to obtain second locations of the lighting devices 120, 130, 140 and/or their corresponding light effects 122, 132, 142. The processor 104 is further configured to obtain object information about the object 160, the object information comprising at least dimensions of the object 160 and a third location of the object in the area 110. The processor 104 is further configured to determine, based on the first, second and third locations and the object dimensions, if the object 160 is located between the user 150 and the lighting devices 120, 130, 140 and/or their corresponding light effects 122, 132, 142. The processor 104 is further configured to control the lighting devices 120, 130, 140 based on the determination. The processor 104 may control the lighting devices 120, 130, 140 by generating lighting control commands and transmitting the lighting control commands via a transmitter 106 to the lighting devices 120, 130, 140.

The controller 100 may, for example, be comprised in a central (home) control system, in a hub, in a bridge, in a user device such as a smartphone, in a lighting device, etc. In embodiments, the controller 100 may be comprised in a remote server, which may be configured to communicate with the lighting devices 120, 130, 140 of the lighting system via a network or via the internet.

The lighting devices 120, 130, 140 may be any type of lighting devices arranged for receiving lighting control commands. The lighting devices 120, 130, 140 may comprise LED light sources. The lighting devices 120, 130, 140 may be arranged for providing general lighting, task lighting, ambient lighting, atmosphere lighting, accent lighting, indoor lighting, outdoor lighting, etc. The lighting devices 120, 130, 140 may be installed in a luminaire or in a lighting fixture. Alternatively, the lighting devices 120, 130, 140 may be portable lighting devices.

The receiver 102 is configured to receive a detected first location of the user 150 in the area 110. Various wired and wireless communication protocols may be used for receiving location information about the location of the user 150, for example Ethernet, DMX, DALI, USB, Bluetooth, Wi-Fi, Li-Fi, 3G, 4G or ZigBee. The location of the user 150 may be detected by any (indoor) positioning system, such as a radio frequency (RF) beacon-based positioning system, a visible light communication (VLC) based positioning system, a camera-based positioning system or any other sensor based positioning system. These positioning systems are well known in the art, and will therefore not be discussed in detail. The positioning system may communicate the location of the user 150 to the controller 100.

The processor 104 may be configured to obtain a second location of a lighting device in the area. The second location may be a fixed location for a lighting device with a fixed location. Alternatively, the lighting device may be a portable lighting device, and the location of the portable lighting device may be detected by a positioning system and communicated to the controller 100. The processor 104 may obtain the second location from a memory, which may be comprised in the controller 100 or may be located remotely. In embodiments, the processor 104 may obtain the second location from a central (lighting) control system. In embodiments, the processor 104 may receive the second location via the receiver 102.

Additionally or alternatively, the processor 104 may be configured to obtain a location of a light effect of a lighting device in the area. The light effect that can be created by the lighting device depends on certain parameters. These parameters may comprise the location of the lighting device, the orientation location of the lighting device, light emission characteristics such as the lighting device's beam shape and the current light setting, the presence of objects in the vicinity of the lighting device, etc. One or more of these parameters may be known, which enable calculation of the location of the light effect of the lighting device. For instance, a spot light may be located at a predefined location in a room, and emit a predefined beam of light. This enables the system to determine where the light effect is in the area 110. In another example, an LED strip may be mounted underneath a tv cabinet. The position of the tv cabinet, and therewith the position of the LED strip may have been detected by a positioning system, or it may have been defined by a user via a user interface. The light emission characteristics of the LED strip, such as its current intensity, may be known to the system, which enables the system to determine the location and the size of the light effect that is generated by the LED strip. Alternatively, a camera may be used to determine a location of the light effect of the lighting device. The location and the orientation of the camera relative to the area may be known, which enables determining the location of the light effect relative to the area. Additionally, the lighting device may be configured to embed a code in the light. The code may comprise an identifier of the lighting device, which enables the camera system to identify the code and to determine the location of the light effect of the lighting device.

The processor 104 is further configured to obtain object information about the object 160, the object information comprising at least dimensions of the object 160 and a third location of the object 160 in the area 110. The object 160, such as a wall or a window, may be located at a fixed position, and the location of the object 160 may therefore also be fixed. The processor 104 may obtain the (fixed) third location from a memory, which may be comprised in the controller 100 or may be located remotely. In embodiments, the processor 104 may obtain the location of the object 160 from a central (building) control system or from a building information model. Alternatively, the object 160 may be a repositionable object, such as furniture, and the third location may therefore change over time. The third location of the repositionable object may for example be detected by a positioning system and communicated to the controller 100. The object 160 may comprise a tag (e.g. an RF tag), which enables detection of the location of the object 160 by a positioning system. The tag may comprise information about the dimensions of the object, which enables the positioning system to obtain the object's dimensions. Alternatively, the location and/or the dimensions of the object 160 may be provided by a user via a user interface. Alternatively, the location and/or the dimensions of the object 160 may be determined by one or more (depth) cameras. Different mapping techniques, such as Simultaneous Localization and Mapping (SLAM), may be used to determine the location and/or the dimensions of the object 160. These are well known in the art, and will therefore not be discussed in detail. The object information may further comprise information about the orientation of the object 160, which may be further used to determine whether the object 160 is located between a lighting device and a user. The object information may further comprise information about the transparency of (a part of) the object 160, which may be further used by the processor 104 to determine if the lighting device and/or its light effect may be visible to a user through a transparent object and control the lighting device based thereon. The object 160 may be partially transparent (e.g. a window in a wall, an opening in a cabinet, etc.). The transparency information may further comprise information about the location of transparent elements of the object 160 relative to the object 160 (e.g. a transparent window in a non-transparent wall), which enables the processor 104 to determine if the lighting device and/or its light effect is visible to a user through a part of the object 160 and to control the lighting device based thereon. The transparency information may further be indicative of a level of transparency (e.g. fully transparent or semi-transparent), indicating to which the degree the (part of the) object 160 is transparent. In embodiments, the processor 104 may receive information about the third location via the receiver 102.

The object information further comprises information about the dimensions of the object 160. The processor 104 may, for example, receive the object dimensions via the receiver or the processor 104 may obtain the object dimensions from a memory, which may be comprised in the controller 100 or may be located remotely. This enables the processor 104 to determine how the object 160 fills the physical space in the area 110, which information may be used to determine if the object 160 is located between a lighting device and a user.

The processor 104 is further configured to determine, based on the location of a user, the location of a lighting device, the location of an object and the object's dimensions, if the object is located between the user and the lighting device and/or its light effect. Referring to FIG. 1, wherein the object 160 is a wall or a cabinet, the processor 104 may determine, based on the locations of the object 160, the lighting devices 120, 130, 140 and the user 150, that the object 160 is located between the user 150 and lighting devices 120 and 130. Furthermore, the processor 104 may determine that only lighting device 140 is visible to the user 150. Furthermore, the processor 104 may determine that the object 160 is not located between the light effect 122 of lighting device 120, and that the light effect 122 is therefore visible to the user 150. The processor 104 may be configured to determine a level of light, emitted by the lighting device 120, being visible from the location of the user 150. The level of light may, for instance, be a percentage of the total light emitted by the lighting device. Furthermore, the processor 104 may determine that the light effect 132 of lighting device 130 is not visible to the user 150, and that light effect 142 of lighting device 140 is visible to the user.

The processor 104 is further configured to control a lighting device based on whether the lighting device and/or its light effects is visible to a user. Additionally, the processor 104 may be configured to control a lighting device based on a level of light visible from the location of the user. Referring to FIG. 1, the processor 104 may for example switch lighting device 130 off (or keep lighting device 130 off if it was already off), because it is not visible to the user 150. The processor 104 may switch lighting device 140 on, because the lighting device 140 (and its light effect 142) are visible to the user. For controlling lighting device 120 several options may be possible, wherein each option may be dependent on the requirements for a specific user or for a specific light scene. A first option would be to turn lighting device 120 off because the lighting device 120 is not visible, and its effect 122 is barely visible to the user 150. A second option would be to control lighting device 120 according to a similar light setting as lighting device 140. A third option would be to dim lighting device 120 to a low intensity, as its effect 122 is barely visible, but it may be desirable to illuminate the area such that the user 150 can see what is in there. A fourth option would be to control 120 lighting device according to a light setting with an intensity higher than the light setting of lighting device 140, because its effect 122 is barely visible. It should be understood that these options are mere examples, and that the skilled person is able to determine alternative options without departing from the scope of the appended claims.

The processor 104 may be further configured to obtain an orientation of the user 150 (e.g. from a positioning system, from a camera system, from a smart device carried by the user, etc.). Optionally, the processor 104 may use this information to determine a field of view or a line of sight of the user 150. Alternatively, the processor 104 may receive information about the field of view of the user 150. The processor 104 may be further configured to determine if the lighting devices 120, 130, 140 or their respective light effects 122, 132, 142 are located in the field of view or line of sight of the user 150. Referring to FIG. 1, the processor 104 may determine, based on the orientation and/or the field of view of the user 150, that lighting device 140 and its light effect 142 are located in the field of view of the user, and that lighting devices 120 and 130 and their respective light effects 122 and 132 are not located in the field of view of the user 150. The processor 104 may further control the lighting devices 120, 130, 140 based thereon.

The processor 104 may be further configured to determine a distance between a user and a lighting device and/or its light effect. The processor 104 may calculate the distance based on the location of the user and the location of the lighting device in the area. The processor 104 may be further configured to control the lighting device based on the distance. The processor 104 may be configured to only control the lighting device according to a certain light setting if the lighting device is located within a predetermined range from the user. The distance between the user and a lighting device and/or its light effect may be determined continuously or periodically (e.g. every predetermined time interval). The light setting may be a light setting associated with and/or selected by the user. This enables a 'follow-me' lighting function, wherein the light setting 'follows' the user, but wherein only lighting devices are controlled that are visible to the user, and wherein lighting devices of which the view is blocked by the object are not controlled according to the light setting. In another example, the processor 104 may determine a dim level based on the distance between the user and a lighting device. This enables spatial dimming, wherein, for example, lighting devices located further away from the user, which are visible to the user or which light effects are visible to the user, are controlled according to a lower dim level compared to lighting devices that are located closer to the user. Referring to FIG. 1, the processor 104 may calculate distances 124, 134, 144 between the user 150 and the lighting devices 120, 130, 140 and distances 126, 146 between the user 150 and the light effects 122, 142 that are visible to the user 150. Based on these distances, the processor 140 may determine to control lighting devices 120 and 140 according to, for example, a user-defined light setting, because their light effects 126, 146 are located within a predefined distance from the user 150.

Figure 2:
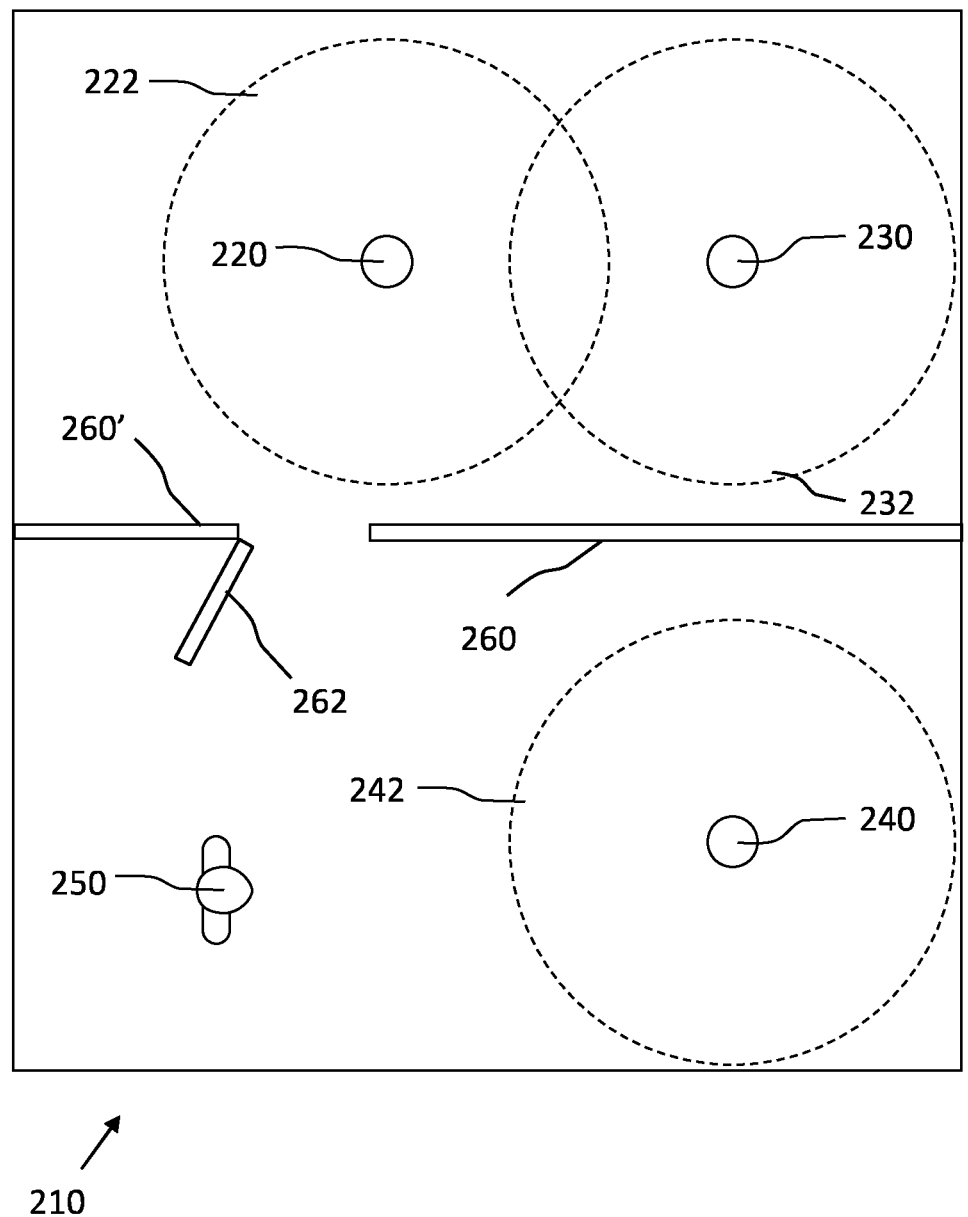
FIG. 2 shows schematically an embodiment of a top view of a system comprising a plurality of lighting devices in two subareas separated by a wall and a door.

FIG. 2 illustrates another example of an area 210 comprising the controller (not shown) and a lighting system comprising lighting devices 220, 230 and 240. In this example, three objects are located in the area 210: a first part of a wall 260, a second part of the wall 260' and a door 262. In this example, the user is located in a first subarea of the area 210. The first subarea comprises lighting device 240, which is configured to generate light effect 242. A second subarea comprises lighting devices 220 and 230, which are configured to generate light effects 222 and 232, respectively. In this example, the visibility of lighting device 220 from a user's perspective is dependent on whether the door is open or not. In the example in FIG. 2, the door is open, which enables a user 250 to see lighting device 220 and its light effect 222. The processor may obtain object information about the locations of the wall 260, 260' and the door from, for example, a building information model. Additionally, the processor 104 may receive information about a status/location of the door 262, which may be an indicator indicating the angle of the door 262, from a sensor comprised in the door, or from an external system such as a camera system. In the example of FIG. 2, the processor 104 may determine that the objects, i.e. the wall 260, 260' and the door 262 are not located between the user 250 and lighting device 220 and its light effect 222. Thus, the processor 104 may control both lighting devices 220 and 240 according to a (predefined/user-defined) light setting.

Figure 3:
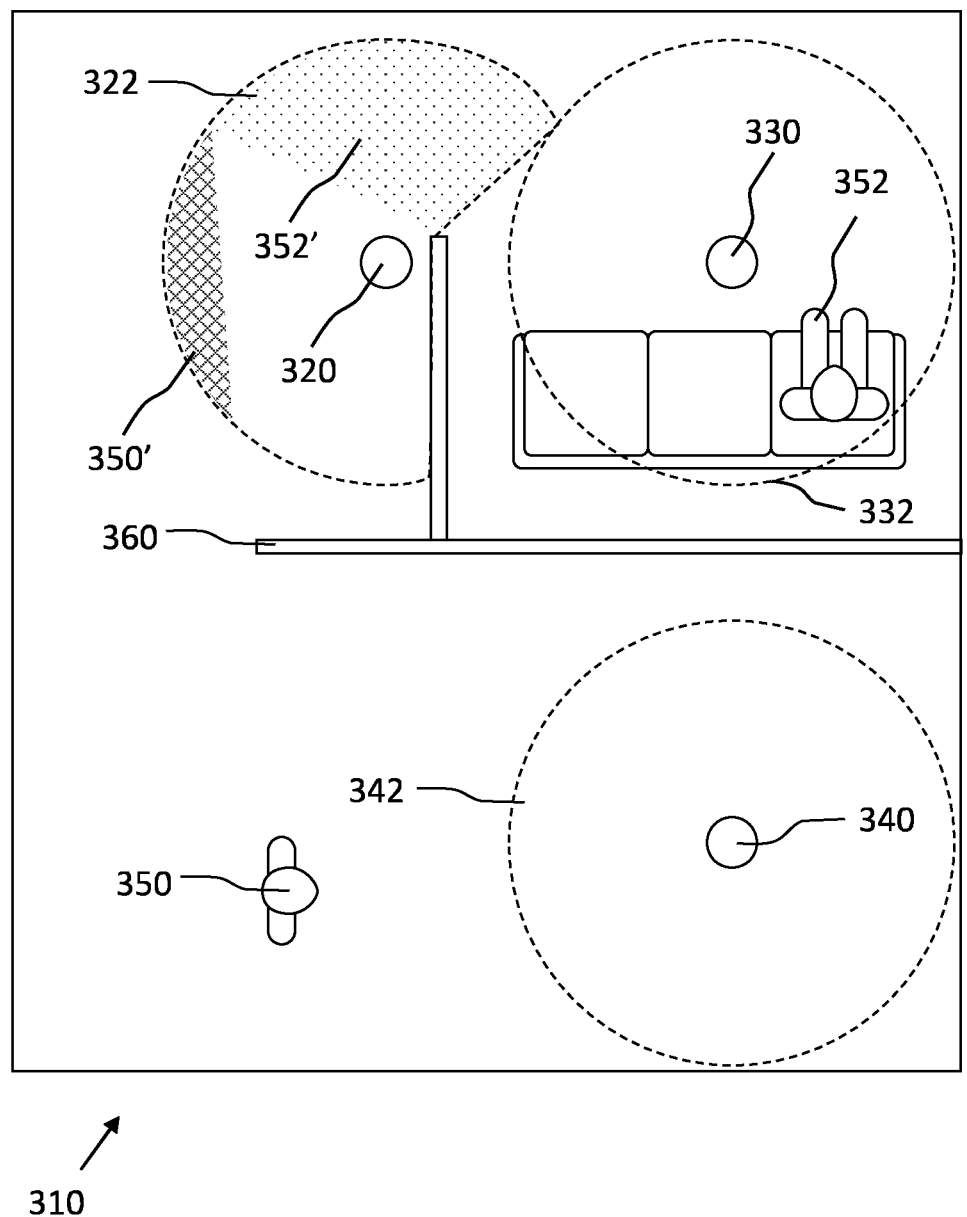
FIG. 3 shows schematically an embodiment of a top view of a system comprising a plurality of lighting devices in an area wherein two users are present.

The processor 104 may be further configured to detect a fourth location of a second user in the area. The processor may further determine, based on the fourth, second and third location and the object dimensions, if the object is located between the second user and the lighting device and/or its light effect. The processor 104 may be further configured to controlling the lighting device according to a first light setting associated with a first user if the object is located between the second user and the lighting device and/or its light effect. If the object is located between the first user and the lighting device and/or its light effect, the processor 104 may control the lighting device according to a second light setting associated with the second user. Referring to FIG. 3, the processor (not shown) may determine, based on the location of a first user 350 and the location of a second user 352, that object 360 (e.g. a wall) is located in between the first user 350 and lighting device 330, and that the object 360 is located in between the second user 352 and lighting device 340. Based thereon, the processor may control lighting device 330 according to a light setting associated with the second user 352 and lighting device 340 according to a light setting associated with the first user 350.

A lighting device may be visible to both the first and the second user. The processor 104 may be further configured to determine a first distance between a first user and that lighting device, and a second distance between a second user and that lighting device, and control the lighting device according to a light setting associated with a user that is located closest to the lighting device. Referring to FIG. 3, the processor may determine that lighting device 320 is visible to both the first user 350 and the second user 352. The processor may further calculate a distance between the first user 350 and the lighting device 320, and a distance between the second user 352 and the lighting device 320, and conclude that lighting device 320 is closer to the second user 352, and control the lighting device 320 according to a light setting (e.g. a user selected light setting) associated with the second user 352.

Additionally or alternatively, the processor 104 may be further configured to determine a first level of light, emitted by the lighting device, being visible from the location of the first user, and determine a second level of light, emitted by the lighting device, being visible from the location of the second user, and control the lighting device according to a light setting associated with a user for which the level of light is highest. Referring to FIG. 3, the processor may determine that the light effect of lighting device 320 is visible to both the first user 350 and the second user 352. The processor may further determine a first level of light 350', emitted by the lighting device 320, being visible from the location of the first user 350, and determine a second level of light 352', emitted by the lighting device 320, being visible from the location of the second user 352, and control the lighting device 320 according to a light setting associated with the second user 352, because the second level of light visible to the second user 352 is higher than the first level of light visible to the first user 350.

Additionally or alternatively, the processor 104 may be further configured to control the lighting device based on a priority value of the first and the second light settings associated with the first and the second user, respectively. The priority value may, for example, be based on a type of light setting (e.g. a task or functional light setting may have a higher priority value than an ambient or entertainment light setting, or vice versa), or it may for example be based on a user profile (e.g. a first user may have a higher priority value than a second user). Thus, when a lighting device is visible to both the first and the second user, the processor may control that lighting device based on the priority values of the light settings associated with these users.

Figure 4:
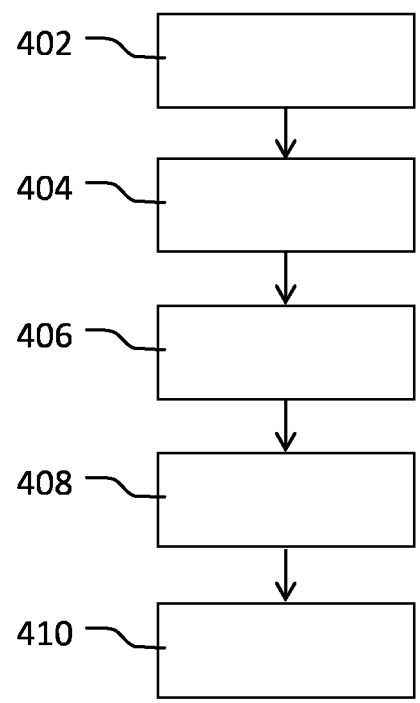
FIG. 4 shows schematically a method of controlling a lighting device.

FIG. 4 shows schematically a method 400 of controlling a lighting device. The method comprises the steps of: detecting 402 a first location of a user in an area, 404 obtaining a second location of the lighting device and/or its light effect in the area, obtaining 406 object information about an object, the object information comprising at least dimensions of the object and a third location of the object in the area, determining 408, based on the first, second and third location and the object dimensions, if the object is located between the user and the lighting device and/or its light effect, and controlling 410 the lighting device based on the determination.

The method 400 may be executed by computer program code of a computer program product when the computer program product is run on a processing unit of a computing device, such as the processor 104 of the controller 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins).

Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling a lighting device, the method comprising:
    receiving a first location of a user in an area,
    obtaining a second location of the lighting device and/or its light effect in the area,
    obtaining object information about an object, the object information comprising a third location of the object in the area, wherein the object information further comprises transparency information about the object,
    determining, based on at least the first, second and third location, if the object is located between the user and the lighting device and/or its light effect, and if the object is determined to be located between the user and the lighting device and/or its light effect, determining if the lighting device and/or its light effect is visible for the user based, at least in part, on the transparency information, and
    controlling the lighting device based on at least one user-defined light setting if the lighting device and/or its light effect is visible for the user.

2. The method of claim 1, wherein the step of determining if the object is located between the user and the lighting device and/or its light effect comprises:
    determining a level of light, emitted by the lighting device, being visible from the first location, and
    wherein the step of controlling the lighting device comprises controlling the lighting device based on the level of light being visible from the first location.

3. The method of claim 1, wherein the step of controlling the lighting device comprises: switching the lighting device off if the object is located between the user and the lighting device and/or its light effect.

4. The method of claim 1, wherein the step of controlling the lighting device comprises determining a dim level for the light emitted by the lighting device based on the determination.

5. The method of claim 1, further comprising the step of determining a distance between the user and the lighting device and/or its light effect, wherein step of controlling the lighting device further comprises: controlling the lighting device based on the distance.

6. The method of claim 1, further comprising:
    receiving a fourth location of a second user in the area,
    determining, based on at least the fourth, second and third location, if the object is located between the second user and the lighting device and/or its light effect, and
    controlling the lighting device according to the at least one user-defined light setting associated with the user if the object is located between the second user and the lighting device and/or its light effect, or
    controlling the lighting device according to a light setting associated with the second user if the object is located between the user and the lighting device and/or its light effect.

7. The method of claim 6, further comprising the steps of:
    determining a first distance between the user and the lighting device,
    determining a second distance between the second user and the lighting device, and
    controlling, if the object is not located between the user and the lighting device and/or its light effect and not located between the second user and the lighting device and/or its light effect, the lighting device according to the at least one user-defined light setting if the first distance is shorter than the second distance.

8. The method of claim 6, wherein the at least one user-defined light setting has a higher priority value than the light setting associated with the second user, further comprising the steps of:
    controlling, if the object is not located between the user and the lighting device and/or its light effect and not located between the second user and the lighting device and/or its light effect, the lighting device according to the at least one user-defined light setting based on the higher priority value.

9. The method of claim 1, wherein the object is located at a fixed location relative to the area.

10. The method of claim 1, wherein the object is repositionable relative to the area.

11. A non-transitory computer-readable medium for a computing device, the computer-readable medium comprising computer program code to perform the method of claim 1 when the computer-readable medium is run on a processing unit of the computing device.

12. The method of claim 1, wherein the step of receiving a first location of a user in an area includes receiving an orientation of the user, and wherein the step of determining if the lighting device and/or its light effect is visible for the user is based, at least in part, on the transparency information and the orientation of the user.

13. A controller for controlling a lighting device, the controller comprising:
    a receiver configured to receive a detected first location of a user in an area,
    a processor configured to:
        obtain a second location of the lighting device and/or its light effect in the area, to obtain object information about an object, the object information comprising at least a third location of the object in the area, wherein the object information further comprises transparency information about the object,
        determine, based on at least the first, second and third location, if the object is located between the user and the lighting device and/or its light effect, and
        if the object is determined to be located between the user and the lighting device and/or its light effect, determine if the lighting device and/or its light effect is visible for the user based, at least in part, on the transparency information, and
        control the lighting device based on at least one user-defined light setting if the lighting device and/or its light effect is visible for the user.

14. A system comprising the controller of claim 13 and a lighting device configured to receive lighting control commands from the controller.

15. The controller of claim 14, wherein the receiver is further configured to receive an orientation of the user, and wherein the processor is further configured to determine if the lighting device and/or its light effect is visible for the user based, at least in part, on the transparency information and the orientation of the user.

\* \* \* \* \*